Patented Apr. 1, 1952

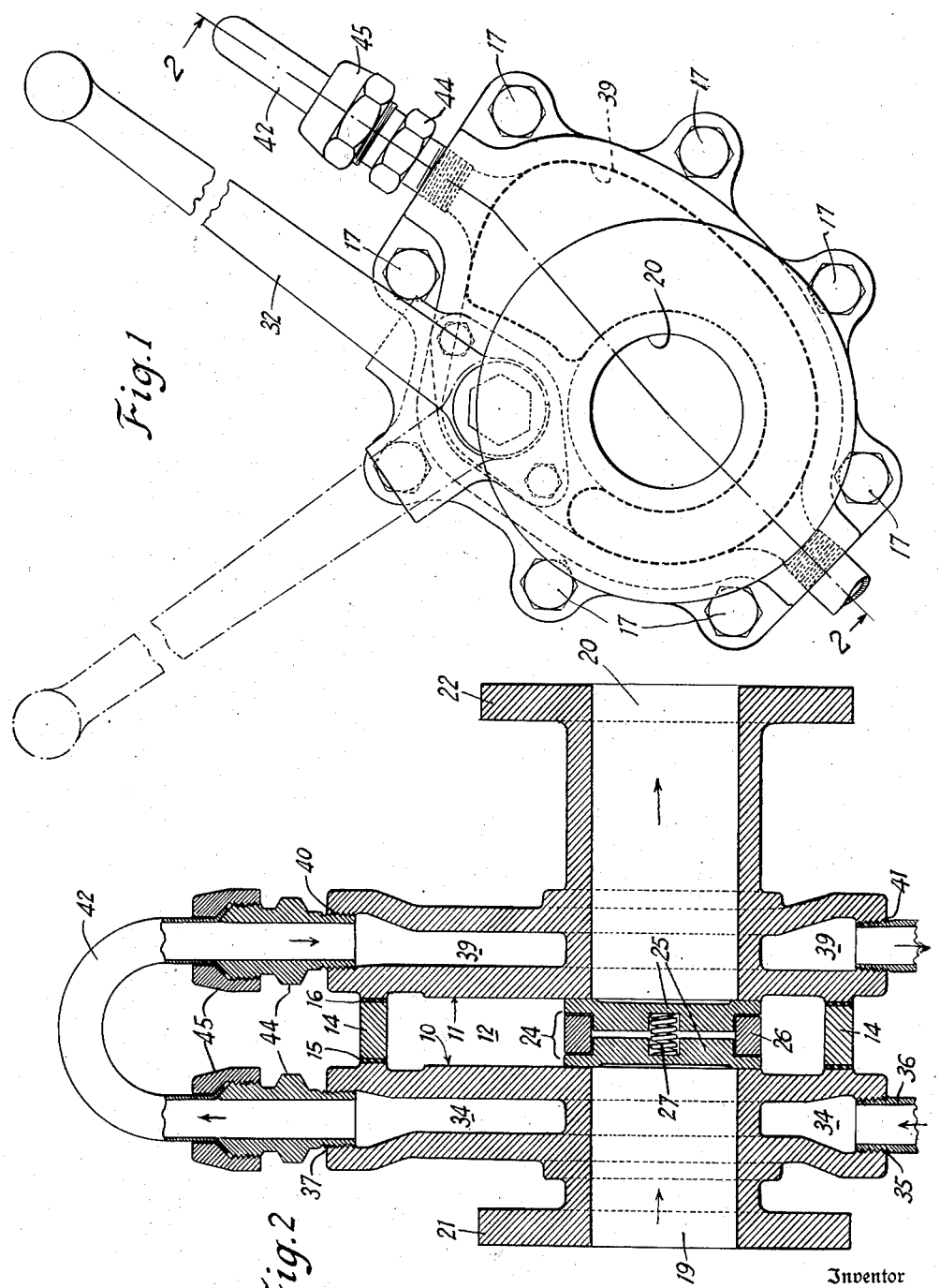

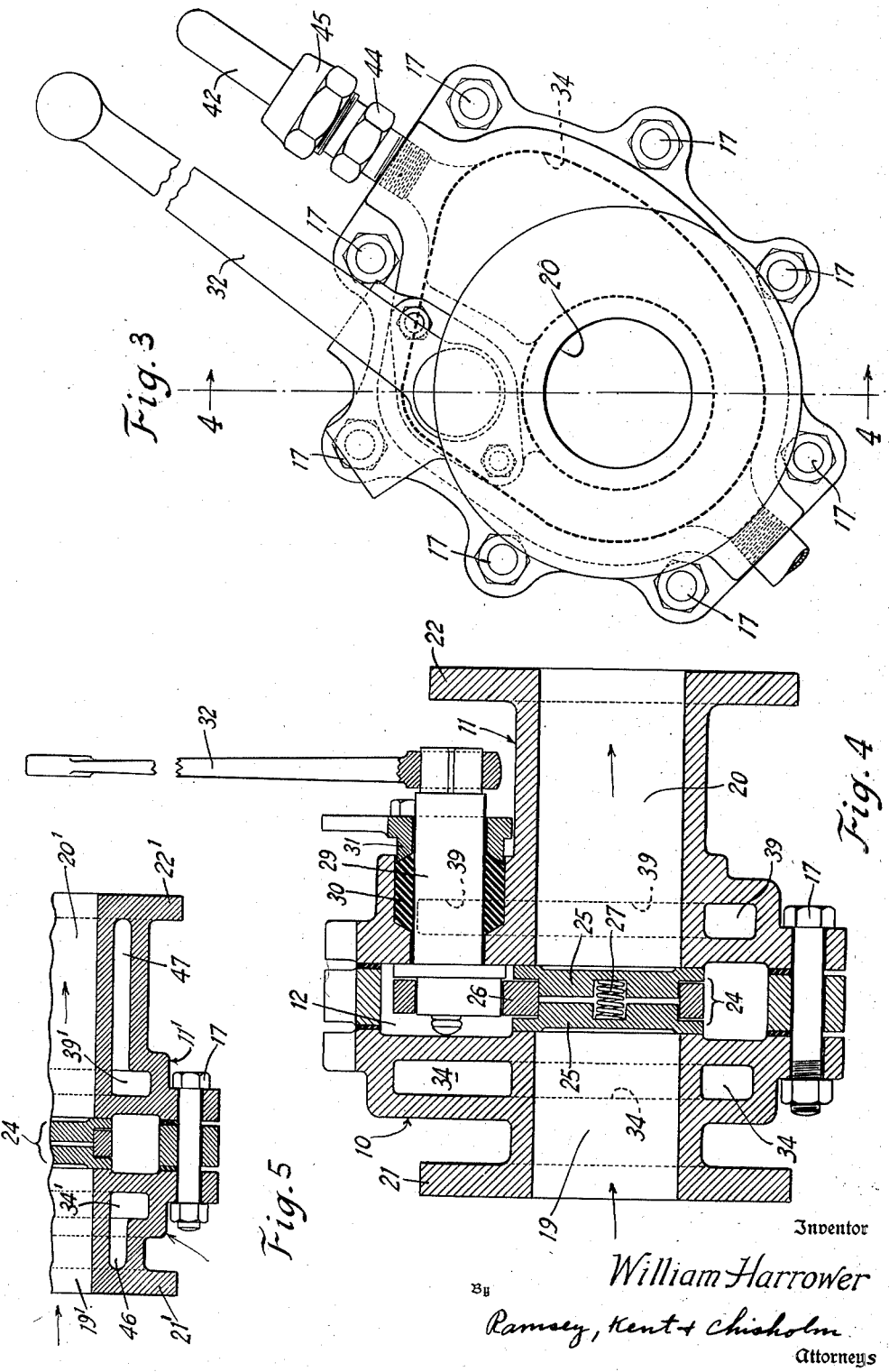

2,591,429

UNITED STATES PATENT OFFICE 2,591,429

VALVE

William Harrower, Jersey City, N. J., assignor to Everlasting Valve Company, Jersey City, N. J., a corporation of New Jersey Application September 24, 1947, Serial No. 775,846

2 Claims. (Cl. 251—18)

This invention relates to valves. It is particularly applicable to swinging gate valves used for controlling the flow of asphalt or other material which, at ordinary temperatures, is too viscous to flow satisfactorily.

Such materials as asphalt and various petroleum products may be sufficiently fluid only at elevated temperatures for convenient flow through pipes. In the handling of such material in pipe lines it is often necessary to heat the lines in order to maintain the material sufficiently fluid. Particular difficulty is encountered in the operation of valves in such pipe lines, since the material tends to become chilled at the valves due to the extra heat-absorbing capacity thereof, and extra heat-radiating surface thereof, as compared with the remainder of the line. Thickening of the material at the valve is particularly likely to occur during periods when a valve is closed, sometimes making it impossible to reopen the valve without taking special steps.

Attempts have been made to overcome this difficulty by providing the valve with a steam chamber. However, the attempts which are known to me have been only partially successful in that valve operating difficulty still occurred, particularly after the valve had been closed for a time.

In the form shown of the present invention, a swinging gate valve of the type known in the trade as the "Everlasting" valve is so steam jacketed that all parts of the valve body, and all operating parts of the valve, are maintained at a sufficiently uniform elevated temperature to prevent troublesome thickening of the material, even during periods when the valve is closed. Jackets within the valve body pass steam along the opposite parallel sides of the valve chamber in such fashion as to maintain the entire chamber and the gate at an elevated temperature that is sufficient to insure free operation of the valve member at all times. In one form of the invention the jacketing also passes the steam around the necks of the valves. One feature of the present invention is that two separate jackets are used, one for each bonnet of the valve body, these two jackets being connected in such manner that the gaskets sealing the valve chamber are in no way modified or affected by the steam jackets and their connection.

A general object of the present invention is to provide for more uniform and effective heating of a valve used for controlling the flow of asphalt and other viscous materials.

Another object of the invention is to provide a valve jacketed in such fashion that steam passing through the jacket will maintain all parts of the valve chamber and the valve operating parts at a temperature sufficiently high to keep the valve freely operable when used to control the flow of asphalt or the like.

A further object of the invention is to provide a valve having jackets that will not trap heating or cooling fluid therein.

A further object of the invention is to provide an adequately jacketed gate valve which may be manufactured by usual procedures, and which may be assembled or disassembled readily.

A still further object of the invention is to provide a jacketed valve in which there are a plurality of jackets and the connection therebetween is completely separated from the gasket sealing the valve chamber.

Further objects, and objects relating to details and economies of construction, operation and use will more definitely appear from the detailed description to follow.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts may at times be identified by specific names for clarity and convenience, but such nomenclature is to be understood as having the broadest meaning consistent with the context and with the concept of my invention as distinguished from the pertinent prior art. The best forms in which I have contemplated applying my invention are illustrated in the accompanying drawing forming part of this specification, in which:

Fig. 1 is an end elevation of a swinging gate valve constructed in accordance with the present invention, the outline of the steam jacket inside one of the bonnets being indicated by heavy broken lines.

Fig. 2 is a longitudinal section of the same valve, taken in general on the line 2—2 of Fig. 1.

Fig. 3 is a view similar to Fig. 1, the outline of the steam jacket within the other bonnet being indicated by heavy broken lines.

Fig. 4 is a longitudinal section, taken on the line 4—4 of Fig. 3.

Fig. 5 is a fragmentary longitudinal section similar to Fig. 4, showing a modified form of jacketed valve.

Referring to the drawings, Figs. 1 through 4 show a swinging gate valve of the form known in the trade as the "Everlasting" valve. This valve has a left-side bonnet 10 and a right-side bonnet 11 which define two spaced parallel side walls of a valve chamber 12. A circumferential wall of the chamber 12 may be formed by a third member 14 placed between the bonnets 10 and 11, or the member 14 may be formed as an integral portion of one of the bonnets. Gaskets 15 and 16 are interposed between the joining surfaces of these parts so as to form a fluid-tight seal about the valve chamber 12. The bonnets 10 and 11 are held together in sealing relation with the gaskets 15 and 16 by a plurality of circumferentially-disposed bolts and nuts 17 which are engaged in extended flanges of these bonnets. This assembly of parts is commonly referred to as the valve body.

The left-side bonnet 10 is provided with an inlet port 19 opening into the valve chamber 12. This port is ordinarily cylindrical and, in assembly with a pipe, is a continuation of the inner diameter of the pipe. A similar port 20 in the right-hand bonnet 11 also connects with the valve chamber 12, in alignment with the inlet port 19, and serves as an outlet port for the valve. Terminal connections, which may comprise flanges 21 and 22 serve to connect the valve, in conventional manner, with similar flanges on inlet and outlet pipes respectively. Ordinarily each of the flanges 21 and 22 is provided with a suitable number of bolt holes (not shown).

A circular valve member or gate 24 of diameter somewhat larger than that of the valve ports 19 and 20 is swingably mounted within the valve chamber 12. The valve member, in the form shown, comprises a pair of circular stepped discs 25, 25 (see Figs. 2 and 4) which are retained within the ring-like end of a lever 26. A compression spring 27 serves to urge the valve discs 25, 25 against the opposite parallel sides of the valve chamber 12, with which they make a lapped fit.

The other end of lever 26 is non-rotatively secured to a short valve-operating shaft 29 (Fig. 4) journaled in the bottom bonnet 11 and extending therethrough. Suitable packing 30, compressed by a gland 31, provides a fluid-tight seal about this shaft. A valve-operating arm 32 is non-rotatively secured to the outer end of the shaft 29 and serves to oscillate this shaft.

Oscillation of the shaft 29 serves to move the valve gate 24 within the valve chamber 12 between closed position (shown in Figs. 2 and 4) and open position in which the gate lies in an extended portion of the valve chamber 12, the gate then being entirely clear of the valve ports 19 and 20 and thus permitting unrestricted flow of fluid material through the valve. This type of valve is well-known in the art, and a somewhat similar valve is shown in U. S. Patent 1,991,006 issued February 12, 1935. However, in the form shown of the present valve, the gate 24 is symmetrical and the inlet and outlet ports of the valve may be exchanged without varying the remainder of the valve in any respect. Hence, while port 19 has, for convenience, been termed the inlet port, and port 20 the outlet port, port 20 may equally well serve as the inlet port, and port 19 as the outlet port.

The bonnet 10, which is preferably formed in one piece of cast iron, has a jacket space 34 extending completely around the inlet port 19. The space 34 also extends over one entire side wall of the valve chamber 12 except for the port 19 and the annular band of metal which surround the port at its juncture with the valve chamber. The jacket space 34 has an inlet 35 (Fig. 2) at its lower end which may be provided with tapered pipe threads for receiving a steam conduit 36. This jacket space is also provided with an outlet 37 which is at the upper or opposite side of the jacket, as shown in Fig. 2.

The other bonnet 11 is likewise preferably formed in one piece of cast iron. It is provided with a jacket space 39 which extends almost entirely about the outlet port 20 and alongside the valve chamber 12. Inasmuch as the valve-operating shaft 29 passes through bonnet 11, it is not feasible to extend the jacket space 39 entirely about the port 20 and for the entire side of the valve chamber; instead this jacket space has the shape generally indicated by the heavy broken line of Fig. 1. The space 39 is provided with an inlet 40 at the top (Fig. 2) and an outlet 41 at the bottom, each of these outlets being provided with female pipe threads.

The outlet 37 of jacket space 34 is connected with the inlet 40 of jacket space 39 by a U-shaped tube 42 which may be formed of somewhat ductile metal, such as copper. The tube 42 may conveniently be connected with the jacket spaces 34 and 39 by a pair of nipples 44, 44 and collars 45, 45, the ends of tube 42 being flanged for fluid-tight clamping by the collars 45, 45.

Steam at low pressure may be introduced into the jacket space 34 by means of the steam conduit 36, such steam filling the jacket space and surrounding the valve port 19. The steam then flows from the opposite side of the jacket space 34 through the tube 42 to the jacket space 39 where it substantially surrounds the port 20. After passing through the second jacket, the steam passes through the outlet 41 from which the steam and condensed vapors are exhausted or returned for reheating and recirculation.

From a study of Fig. 1 it will be noted that the jacket spaces 34 and 39 are so shaped that there are no substantial pockets to collect condensation. The shape of these jacket spaces is such that, with the valve mounted in various positions, substantially complete drainage of condensate can be obtained. The female threads at 35, 41 are the same, and spaced the same, as the female threads at 37, 40. Thus, the tube 42 can be shifted to connect the openings at 35, 41, the incoming and outgoing steam lines being then connected at 37 and 40. Such interchange of connections is desirable to facilitate drainage when the valve is mounted in certain positions.

In some installations, particularly where the entire pipe line is steam jacketed, it may be desirable to extend the jackets to the terminal flanges 21 and 22 of the valve so as to prevent any stiffening of the material in the necks of the valve. This construction is shown in Fig. 5, in which the jacket space 34' of the left-side bonnet 10' of the valve is provided with a somewhat reduced annular extension 46 which completely surrounds the inlet port 19' and extends out to the flange 21'. The jacket space 39' of the bonnet 11' is provided with a similar annular extension 47 extending around the outlet port 20' and out to the flange 22'. This extended portion of the jacket space substantially surrounds the outlet port 20', i. e. surrounds it throughout the same arc as is shown in heavy broken lines in Fig. 1 for space 39.

A particular advantage of a valve constructed in accordance with either form of the invention shown is that the jacket spaces 34 and 39 (or 34' and 39') are completely contained within the bonnets 10 and 11 (or 10' and 11') respectively. The connection passing heating fluid between these jackets is entirely independent of the valve-chamber-sealing gaskets 15 and 16. Accordingly, there is no difficulty when assembling the valve, either initially or after maintenance disassembly, in attaining tight seals for both the valve chamber 12 and the heating fluid circuit. The tube 42 connecting the two jackets is sufficiently yieldable to accommodate itself regardless of variation in thickness of the gaskets 15 and 16, and these gaskets are not complicated by being required to serve the additional function of sealing the heating fluid circuit as well as the valve chamber 12.

The invention has been disclosed in connection with the valving of pipe lines carrying asphalt or the like, that being its most important commercial application now in view. However, it is apparent that the valve of the present invention is equally applicable to many other types of installations, not only installations in which the valve is to be maintained hot, but also installations in which the valve is to be maintained cool or cold. In the latter case cooling fluid, such as cold water or a refrigerant would be circulated through the jacket spaces.

I claim:

1. A valve comprising a valve body having aligned inlet and outlet ports and a valve chamber therebetween with opposite parallel generally flat sides, the flat sides of said valve chamber being formed by a pair of valve bonnets, a valve operating shaft passing through one of said bonnets beside the valve port thereof, a valve member secured to said operating shaft for oscillatory movement within said valve chamber between open position to one side of said valve ports and closed position between said valve ports, each of said bonnets having a jacket space incorporated therein and the jacket spaces having inlet and outlet ports, the jacket space of the bonnet mounting said valve operating shaft extending beside said valve chamber and around the valve port therein except in the area of the bonnet adjacent the valve-operating shaft, and the jacket space of said other bonnet extending entirely around the valve port therein and beside said valve chamber, and an exterior conduit connecting the jacket spaces of the two bonnets for fluid flow from the jacket space of one bonnet to the jacket space of the other bonnet.

2. A valve as claimed in claim 1, in which the inlet and outlet ports are provided with terminal connections for connecting said valve into a pipe line and the jacket space incorporated within the valve bonnets extends to the terminal connections of the valve.

WILLIAM HARROWER.

REFERENCES CITED

The following references are of record in the file of this patent:

UNITED STATES PATENTS

| Number | Name | Date |
|---|---|---|
| 772,007 | Theis | Oct. 11, 1904 |
| 1,461,520 | Forman | July 10, 1923 |
| 1,487,921 | Deisch | Mar. 25, 1924 |
| 1,535,212 | Egloff | Apr. 28, 1925 |
| 1,633,161 | Cavenagh | June 21, 1927 |
| 1,727,958 | Borchardt | Sept. 10, 1929 |

FOREIGN PATENTS

| Number | Country | Date |
|---|---|---|
| 6,530 | Great Britain | of 1890 |
| 115,572 | Great Britain | of 1918 |